(12) United States Patent
Harrah et al.

(10) Patent No.: US 7,039,948 B2
(45) Date of Patent: May 2, 2006

(54) SERVICE CONTROL MANAGER SECURITY MANAGER LOOKUP

(75) Inventors: Richard Dale Harrah, Seattle, WA (US); Humberto A Sanchez, II, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 721 days.

(21) Appl. No.: 09/800,188

(22) Filed: Mar. 6, 2001

(65) Prior Publication Data

US 2002/0144137 A1     Oct. 3, 2002

(51) Int. Cl.
*H04L 9/32*     (2006.01)

(52) U.S. Cl. .................. 726/6; 707/9; 709/229

(58) Field of Classification Search ........... 713/200, 713/201, 202; 709/217, 225, 229; 726/3, 726/6, 18; 707/1, 9, 10
See application file for complete search history.

(56) References Cited

U.S. PATENT DOCUMENTS

| | | | |
|---|---|---|---|
| 5,485,370 A | * | 1/1996 | Moss et al. ............. 709/217 |
| 5,548,721 A | | 8/1996 | Denslow ............... 395/187.01 |
| 5,627,967 A | * | 5/1997 | Dauerer et al. ............. 713/202 |
| 5,944,824 A | * | 8/1999 | He ............................ 713/201 |
| 5,966,715 A | * | 10/1999 | Sweeney et al. ............ 707/203 |
| 6,005,571 A | | 12/1999 | Pachauri ..................... 345/339 |

OTHER PUBLICATIONS

Fred Mallett; Service Control Manager; Boucher Communication, Inc; Jul. 2000.*

* cited by examiner

*Primary Examiner*—Kim Vu
*Assistant Examiner*—T. B. Truong

(57) ABSTRACT

Role based authorization in a service control manager (SCM) module may allow a system administrator to delegate responsibility to other users by assigning tool based roles to these users on some system so they have full access to such system. To ensure system security, after receiving a request from a user to run a tool on a set of target nodes, an SCM security manager may need to check whether the user is authorized to run the tool on the target nodes. For every target node requested, the security manager may need to check whether the user is authorized on the node, and whether the user is authorized for one of the tool's enabled roles on the node. If the user is not authorized on each of the nodes requested, or is not authorized for any of the tool's enabled roles, the tool is not runnable by the user.

20 Claims, 4 Drawing Sheets

SERVICE CONTROL MANAGER SECURITY MANAGER LOOKUP

TECHNICAL FIELD

The present invention relates to system administration management, and, in particular, to service control manager modules.

BACKGROUND

Tool definition and execution in a service control manager (SCM) module may involve complicated processes, including authorizing a user to run a tool on target nodes. To ensure system security, a process for checking user authorization is needed before the user is allowed to execute the tool on the target nodes. Prior solutions include the use of a database that contains the authorized user identification to run a certain tool. However, the use of the database requires a complicated database application to be installed on the system, and requires the database application to be constantly updated through manual input. A simple user authorization checking process is needed.

SUMMARY

Role based authorization in a service control manager (SCM) module may allow a system administrator to delegate responsibility to other users by assigning tool based roles to these users on a system to provide them with full access to such system. To ensure system security, after receiving a request from a user to run a tool on a set of target nodes, an SCM security manager may need to check whether the user is authorized to run the tool on the target nodes in order to validate the user's authorization.

The method for validating a user's authorization to run a tool in the SCM module by the security manager may include obtaining user identification (ID), a list of target nodes on which to run the tool, and tool definition from a runnable tool object created by the SCM module based on task information provided by the user and tool definition provided by a domain manager. Next, the security manager may obtain roles associated with the tool from the tool definition, and check if any of the roles are enabled. If any of the roles are enabled, the security manager may then check if the user is authorized on all of the nodes, and if the user is authorized for one of the tool's enabled roles on all of the nodes. Only if the user is assigned with any of the tool's enabled roles on all of the target nodes, the security manager will report back to the SCM module indicating that the tool is runnable by the user. If the user is not authorized on each of the nodes requested, or if the user is not authorized for any of the tool's enabled roles, the tool is not runnable by the user.

DESCRIPTION OF THE DRAWINGS

The detailed description refers to the following drawings, in which like numbers refer to like elements, and in which.

DETAILED DESCRIPTION

A service control manager (SCM) module multiplies system administration effectiveness by distributing the effects of existing tools efficiently across managed servers. The phrase "service control manager" is intended as a label only, and different labels can be used to describe modules or other entities having the same or similar functions.

In the SCM domain, the managed servers (systems) are referred to as "managed nodes" or simply as "nodes". SCM node groups are collections of nodes in the SCM module. They may have overlapping memberships, such that a single node may be a member of more than one group. The grouping mechanism may allow flexible partitioning of the SCM module so that users may use it to reflect the way nodes are already grouped in their environment.

Figure 1:
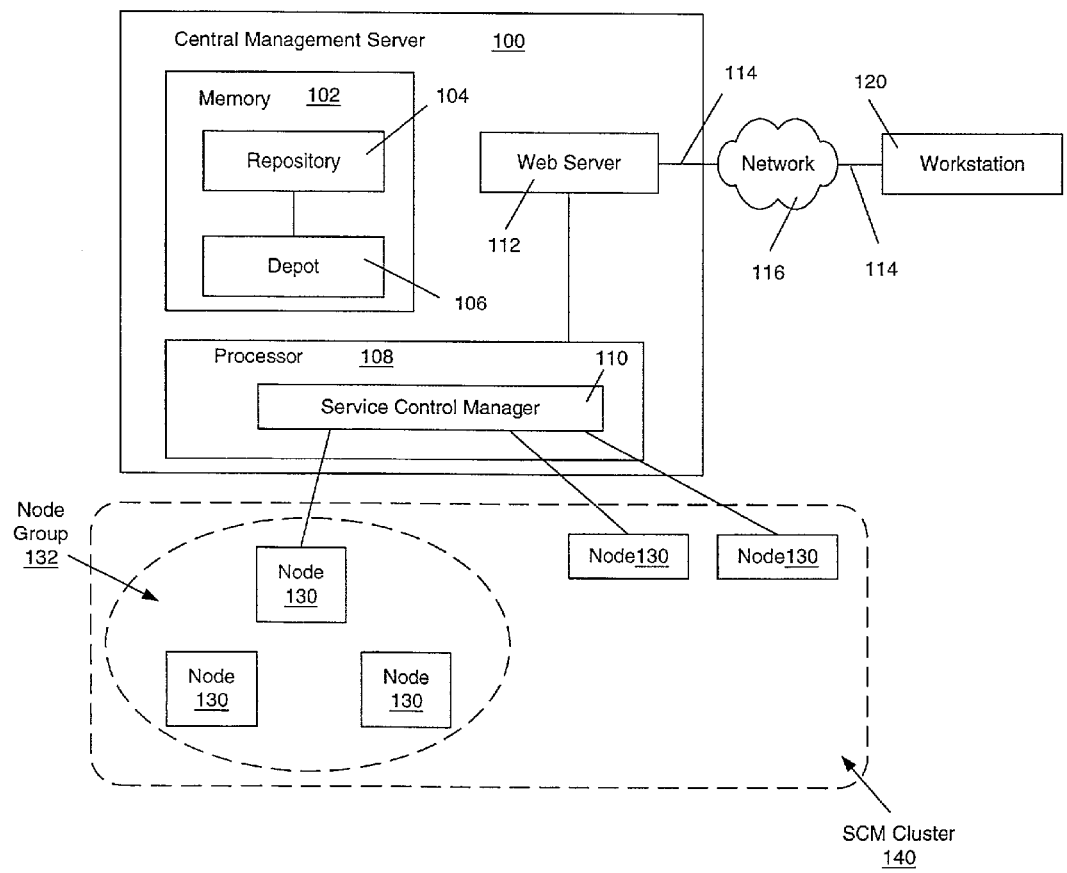
FIG. 1 illustrates a computer network system with which the present invention may be used.

FIG. 1 illustrates a computer network system with which the present invention may be used. The network system includes an SCM 110 running on a Central Management Server (CMS) 100 and one or more nodes 130 or node groups 132 managed by the SCM 110. The one or more nodes 130 and node groups 132 make up an SCM cluster 140.

The CMS 100 can be implemented with, for example, an HP-UX 11.x server running the SCM 110 software. The CMS 100 includes a memory 102, a secondary storage device (not shown), a processor 108, an input device (not shown), a display device (not shown), and an output device (not shown). The memory 102 may include computer readable media, RAM or similar types of memory, and it may store one or more applications for execution by processor 108, including the SCM 110 software. The secondary storage device may include computer readable media, a hard disk drive, floppy disk drive, CD-ROM drive, or other types of non-volatile data storage. The processor 108 executes the SCM software and other application(s), which are stored in memory or secondary storage, or received from the Internet or other network 116. The input device may include any device for entering data into the CMS 100, such as a keyboard, key pad, cursor-control device, touch-screen (possibly with a stylus), or microphone. The display device may include any type of device for presenting a visual image, such as, for example, a computer monitor, flat-screen display, or display panel. The output device may include any type of device for presenting data in hard copy format, such as a printer, and other types of output devices include speakers or any device for providing data in audio form. The CMS 100 can possibly include multiple input devices, output devices, and display devices.

The CMS 100 itself may be required to be a managed node, so that multi-system aware (MSA) tools may be invoked on the CMS. All other nodes 130 may need to be explicitly added to the SCM cluster140.

Generally, the SCM 110 supports managing a single SCM cluster 140 from a single CMS 100. All tasks performed on the SCM cluster 140 are initiated on the CMS 100 either directly or remotely, for example, by reaching the CMS 100 via a web connection 114. Therefore, the workstation 120 at which a user sits only needs a web connection 114 over a network 116, such as the Internet or other type of computer network, to the CMS 100 in order to perform tasks on the SCM cluster 140. The CMS 100 preferably also includes a centralized data repository 104 for the SCM cluster 140, a web server 112 that allows web access to the SCM 110 and a depot 106 that includes products used in the configuring of nodes 130. A user interface may only run on the CMS 100, and no other node 130 in the SCM module may execute remote tasks, access the repository 104, or any other SCM operations.

Although the CMS 100 is depicted with various components, one skilled in the art will appreciated that this server can contain additional or different components. In addition, although aspects of an implementation consistent with the present invention are described as being stored in memory, one skilled in the art will appreciated that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the CMS 100 to perform a particular method.

A central part of the SCM module 110 is the ability to execute various management commands or applications on the one or more nodes simultaneously. The commands or applications may need to be encapsulated with an SCM tool, which is typically used to copy files and/or execute commands on the target nodes 130. The SCM tool may run simple commands such as bdf(1) or mount(1M), launch single system interactive applications such as System Administration Manager (SAM) or Glance, launch multi-system aware applications such as Ignite/UX or Software Distributor (SD), or perform other functions. The tool may be defined using either an SCM tool definition language through command line interface (CLI) or an SCM-provided graphical user interface (GUI).

There are two general types of tools: single-system aware (SSA) tools and multi-system aware (MSA) tools. SSA tools may run on a node 130 and may only affect the operation of that node 130. To run SSA tools on multiple target nodes 130, the SCM module 110 may execute the tools on each target node 130. In addition to executing commands or launching applications, SSA tools may copy files from the CMS 100 to the target nodes 130. Files may only be copied from the CMS 100 to the managed nodes 130 in this exemplary embodiment, not from the nodes 130 back to the CMS 100.

MSA tools may run on a single node 130 but may be able to operate on multiple other nodes 130. MSA tools are applications that execute on a single node but can detect and contact other nodes to accomplish their work and this contact is out of the control of the SCM module 110. This type of application may need to have a list of nodes 130 passed as an argument at runtime. A node 130 where the application will execute may need to be specified at tool creation time, not at runtime. The target nodes 130 selected by the user may be passed to an MSA tool via a target environment variable that contains a target node list for the MSA tools. MSA tools may not copy files to either the manager node 100 or to the target nodes 130 in this exemplary embodiment. Therefore, an execution command string may be required for MSA tools.

An SCM user may be a user that is known to the SCM module 110 and has some SCM related privileges and/or system management roles. An SCM role, which is an expression of intent and a collection of tools for accomplishing that intent, typically defines what the user is able to do on the associated nodes 130 or node groups 132, e.g., whether a user may run a tool on a node 130. Typically, in order to start the SCM module 110 or execute any SCM tools, the user may need to be added to the SCM module 110 and authorized either via the GUI or the command line interface (CLI). All SCM module 110 operations may be authorized based on the user's SCM authorization configuration, and/or whether or not the user has been granted SCM trusted user privilege.

The SCM user may, depending upon the roles assigned, manage SCM systems via the SCM module 110. In addition, the user may examine the SCM module log, and scan the group and role configurations. When the SCM user runs a tool, the result may be an SCM task. The SCM module 110 typically assigns a task identifier for every task after it has been defined and before it is run on any target nodes 130. This identifier may be used to track the task and to look up information later about the task in an SCM central log.

An SCM trusted user is an SCM user responsible for the configuration and general administration of the SCM module 110. The trusted user is typically a manager or a supervisor of a group of administrators whom a company trusts, or other trusted individual. Entrusted with the highest authority, the trusted user may execute any system management task with all of the nodes (machines) managed by the SCM module 110. The capabilities of the trusted user include, for example, one or more of the following: creating or modifying a user's security profile, such as user ID or user's set of SCM authorizations; adding, modifying or deleting a node or node group; enabling or disabling roles; modifying or authorizing tools. The granting of these privileges implies a trust that the user is responsible for configuring and maintaining the overall structure of the SCM module 110.

An SCM authorization model supports the notion of assigning to users the ability to run a set of tools on a set of nodes. An authorization object is an association that links a user to a role on either a node or a node group. Each role may have one or more tools and each tool may belong to one or more roles. When users are given the authority to perform some limited set of functionality on one or more nodes, the authorization is done based upon roles and not on tools. The role allows the sum total of functionality represented by all the tools to be divided into logical sets that correspond to the responsibilities that would be given to the various administrators. Accordingly, there are different roles that may be configured and assigned with authorization. For example, a backup administrator with a "backup" role may contain tools that perform backups, manage scheduled backups, view backup status, and other backup functions. On the other hand, a database administrator with a "database" role may have a different set of tools. When a user attempts to run a tool on anode, the user may need to be checked to determine if the user is authorized to fulfill a certain role on the node and if that role contains the tool. Once a user is assigned a role, the user may be given access to any newly created tools that are later added to the role. In the example given above, the backup administrator may be assigned the "backup" role for a group of systems that run a specific application. When new backup tools are created and added to the "backup" role, the backup administrator may immediately be given access to the new tools on the systems.

Figure 2:
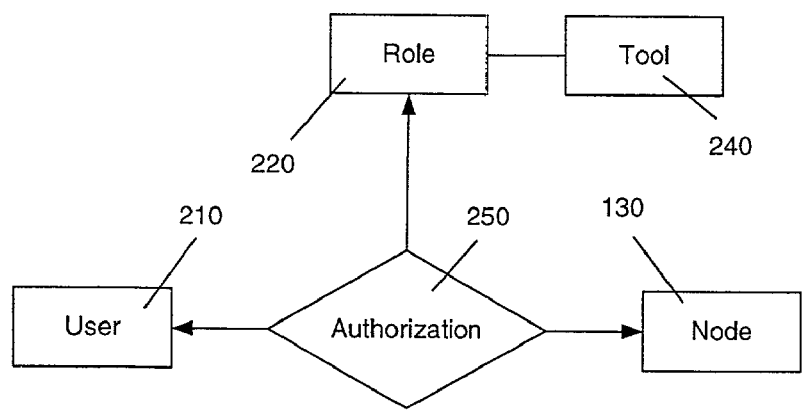
FIG. 2 illustrates the relationships between the user, role, node, tool and authorization objects.

FIG. 2 illustrates the relationships between the user 210, role 220, node 130, tool 240, and authorization 250 objects. User objects 210 represent users 210, role objects 220 represent roles 220, node objects 130 represent nodes 130, tool objects 240 represent tools 240, and authorization objects 250 represent authorizations 250. However, for purposes of this application, these terms are used interchangeably. Each authorization object 250 links a single user object 210 to a single role object 220 and to a single node object 130 (or anode group object 132). Each role object 220 may correspond to one or more tool objects 240, and each tool object 240 may correspond to one or more role objects 220. Each user object 210 maybe assigned multiple authorizations 250, as may each role object 220 and each node object 130. For example, Role 1 may contain Tools 1-N, and User 1 may be assigned Roles 1-M by the authorization model on Node 1. Consequently, User 1 may run Tools 1-N on Node 1, based upon the role assigned, Role 1.

Table 1 illustrates an example of a data structure for assigning tools 240 and commands specified in the tools 240 to different roles 220. Table 2 illustrates an example of a data structure for assigning the roles 220 to different users 210.

TABLE 1

| Roles | Tools | Commands and Applications |
|---|---|---|
| Role 1 | Tools 1-N | Commands 1-L |
| ... | ... | ... |
| Role n | Tools 1-Nn | Commands 1-Ln |

TABLE 2

| Users | Assigned Roles |
|---|---|
| User 1 | Roles 1-M |
| ... | ... |
| User n | Roles 1-Mn |

Although FIG. 2 shows a node authorization, a similar structure exists for a node group 132 authorization. The SCM authorization model may be deployed by using node group 132 authorizations more often than node 130 authorizations. This model makes adding new nodes simpler because by adding a node 130 to an existing group 132, any authorizations associated with the group 132 may be inherited at run-time by the node 130.

The authorization model for determining if a user may execute a tool 240 on a set of nodes 130 may be defined by an "all or none" model. Therefore, the user 210 must have a valid authentication association for each target node 130 to execute the tool 240. If authorization does not exist for even one of the nodes 130, the tool execution fails.

The SCM module 110 may also include security features to secure transactions that transmit across the network. All network transactions may be digitally signed using a public or private key pair. The recipient of network transmissions may be assured of who the transmission came from and that the data was not altered in the transmission. A hostile party on the network may be able view the transactions, but may not counterfeit or alter them.

Figure 3:
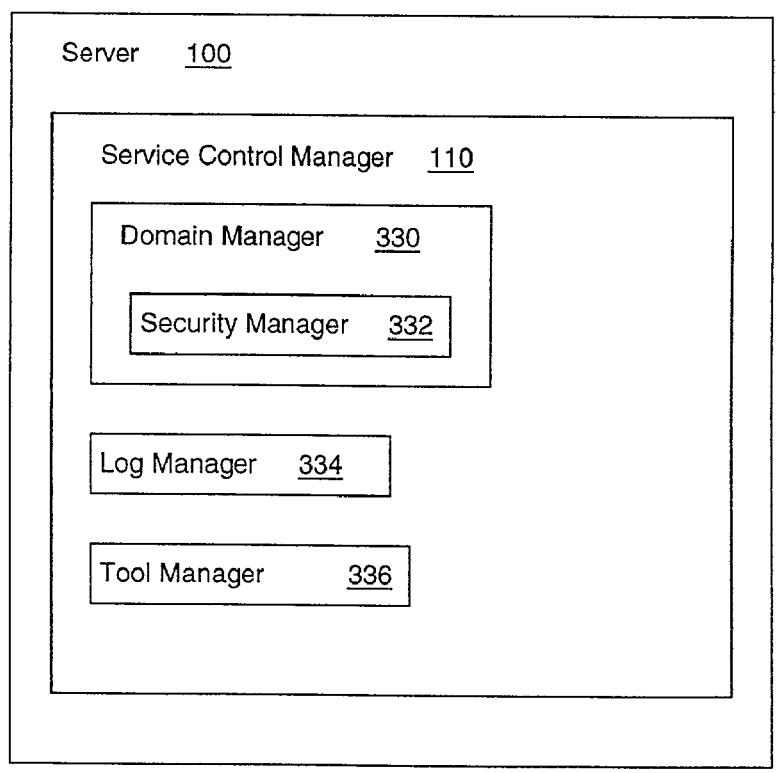
FIG. 3 is a block diagram of an exemplary server used to implement the present invention.

Referring to FIG. 3, the CMS 100 may include a domain manager 330, a log manager 334, and a tool manager 336. The domain manager 330 is the "brain" of SCM module 110 and may be connected to the repository 104 for storage of the definitions of all the objects. A security manager 332, which is a subsection of the domain manager 330, typically guards the system security by checking whether the user 210 is authorized to run the tool 240 on all of the nodes 130 requested, i.e., whether the user 210 is assigned the roles 220 associated with the tool 240 on all of the nodes 130. For example, if a user 210 requests to run a tool 240 on two nodes 130, and the user 210 is only authorized to run the tool on one node 130 but not the other, the SCM module 110 will not run the tool 240 on either node, due to the "all or none" authorization model. The log manager 334 may manage a log file and take log requests and write the requests to the SCM log file. The tool manager 336 typically validates the roles 220 associated with the tool 240.

Tool execution may start with a request from the user 210 to run a tool 240 on one or more nodes 130. The request may include task information, such as the name of the tool to be run, the location of the tool, the nodes on which to run the tool, and required arguments of the tool, if any. An example of tool execution is described in United States patent application of Lister, Sanchez, Drees, and Finz, entitled "Service Control Manager Tool Execution", Ser. No. 09/813,562, and filed on Mar. 20, 2001, which is incorporated herein by reference.

In the next step, the SCM module 110 may retrieve tool definition, node definition and user definition from the domain manager 330 to validate the task information received from the user 210. The domain manager 330, connected to the repository 104, may be contacted to provide tool definition or information about the nodes 130 or the user 210 whenever the clients need to look up a tool 240 or to verify nodes 130. An example of tool definition is described in United States patent application of Lister, Sanchez, Drees, and Finz, entitled "Service Control Manager Tool Definition", Ser. No. 09/800,316, and filed on Mar. 6. 2001, which is incorporated herein by reference. The validation of the task information may include checking whether the nodes requested are the managed nodes, whether the tools actually exist, and whether the required arguments of the tool are given. After the request is validated, the SCM module 110 may create a runnable tool object based on the task information and the tool definition. The runnable tool object may encapsulate the tool 240, the task information received from the user 210, and information that may be picked up from the environment, such as the user's name.

Authorizations for the SCM module 110 may be tuples, including the user 210, the role 220 and the node 130. Internally, the security manager 332 may store, for example, an identification of the users 210 by their UNIX login ID and the roles 220 by their (immutable) SCM role ID. For example, if U represents a user ID, R represents a role ID, and N represents a node name, the set of all authorizations for the SCM module 110 may comprise numerous discrete points tuples of the form (U, R, N)—in a three dimensional space. The set of all configured authorizations may be referred to as an SCM security policy. The security manager data object that stores all the data objects described by the SCM security policy may form, for example, a Java hash table. The hash table is a common data structure for providing fast indexing of information by providing an algorithm that computes some type of address based on a hash key.

There are numerous ways of accessing the security policy of the SCM module 110, based on a request by the user 210. While numerous ways of viewing this data are provided, an algorithm for lookup may be designed for the most common scenario: validating whether a user 210 can execute a tool 240 on one or more nodes 130 by checking whether the user 210 is assigned any of the tool's enabled roles 220 on the nodes 130.

The first step for security manager lookup may be synchronizing on a mutual exclusion mutex. Mutexes are simple lock primitives that can be used to control access to a shared resource—the security policy. The mutex is basically a synchronization object to prevent corruption of data by concurrently accessing the data with different threads. Only one thread or user process is able to manipulate the contents of the cache at one time, and only by acquiring the mutex. Other users must wait until the first user releases the mutex before the USPRS can modify the data. Accordingly, coherency of the data maintained by the security manager 332 may be preserved. There is no Java-specific synchronization on the mutex that controls access to the security policy hash table.

Next, from the runnable tool object, the security manager 332 may obtain the user identification (ID) of the user 210 on whose behalf the tool 240 is to be executed, a list of target nodes 130 on which the user 210 intends to execute the tool 240, and a tool definition that contains role information that must be extracted for the authorization lookup to complete. In order to execute the tool 240, the user 210 must be authorized for at least one of the tool's enabled roles 220 on each target node 130 in this exemplary embodiment. Then, the tool manager 336 may check if the roles 220 are valid.

Some of the roles 220 assigned to the tool 240 maybe disabled, preventing the tool 240 from being executed by the user 210 who is authorized for the role 220 on the target node 130. Therefore, the security manager 332 may need to check that not all roles 220 associated with the tool 240 are disabled.

Next, the security manager 332 may obtain the user's authorized roles 220 on each target node 130 from the hash table, referred to as MxNodeRoleIDHash, using the user ID as the hash key. This may be done by accessing three dimensional data on the user access, resulting in information that describes the roles 220 for which the user 210 is authorized on one or more nodes 130, i.e., the user's authorized roles 220. The hash table may be indexed by node name, and the data stored in the hash table, on a per node basis, may be a vector of the user's authorized roles 220 on the node 130. Vector is a Java term, and may be referred to as a collection of data.

If, however, an attempt to obtain the user's authorized roles 220 from the hash table results in nothing being returned, then the user 210 has no authorizations in the security policy, and the user 210 cannot run any tools 240 in the SCM environment.

The authorization lookup may involve matching two sets of roles 220. The first set of roles 220 is the vector of (enabled) roles 220 assigned to the tool 240. The second set of roles 220 is a vector of all roles 220 (enabled or not) the user 210 is authorized on the current node 130. The security manager 332 typically iterates through the vector of the tool's enabled roles 220, and checks if the user 210 has been authorized for one of these roles 220 on the node 130. If the intersection of the vector (a set) of the tool's enabled roles 220 and the vector (another set) of the user's authorized roles 220 for the current node 130 is not the empty set, then there may exist an authorization in the security policy that allows the user 210 to execute the tool 240 on the current node 130. If the intersection of the two role vectors is an empty set, then authorization lookup fails, and the user 210 cannot run the tool 240.

In summary, the authorization lookup effectively leverages two of the collections provided by, for example, the Java language, hash tables and vectors, to allow a novel way of accessing a complicated space of data. The three dimensional programming data is easily accessed and traversed in an intuitive, and problem domain-specific manner, because of the way it is maintained in the primary hash table. The elements stored and manipulated in this primary hash table are again hash tables, referred to as MxNodeRoleIDHash objects. There may be one of these MxNodeRoleIDHash objects for each node 130 on which an SCM user 210 is authorized a role 220. Given that the most common use of this lookup mechanism is for a scenario where the user ID may be considered constant, one dimension of data complexity is removed rapidly by indexing into the primary hash table by the user name. The resulting object, referred to as MxNodeRoleIDHash, may map the user's authorized roles 220 to nodes 130 for which those roles 220 apply. Then the lookup may be a matter of determining if there is at least one role 220 that is common to the tool's enabled roles 220 and the user's authorized roles 220, for each target node 130.

Figure 4:
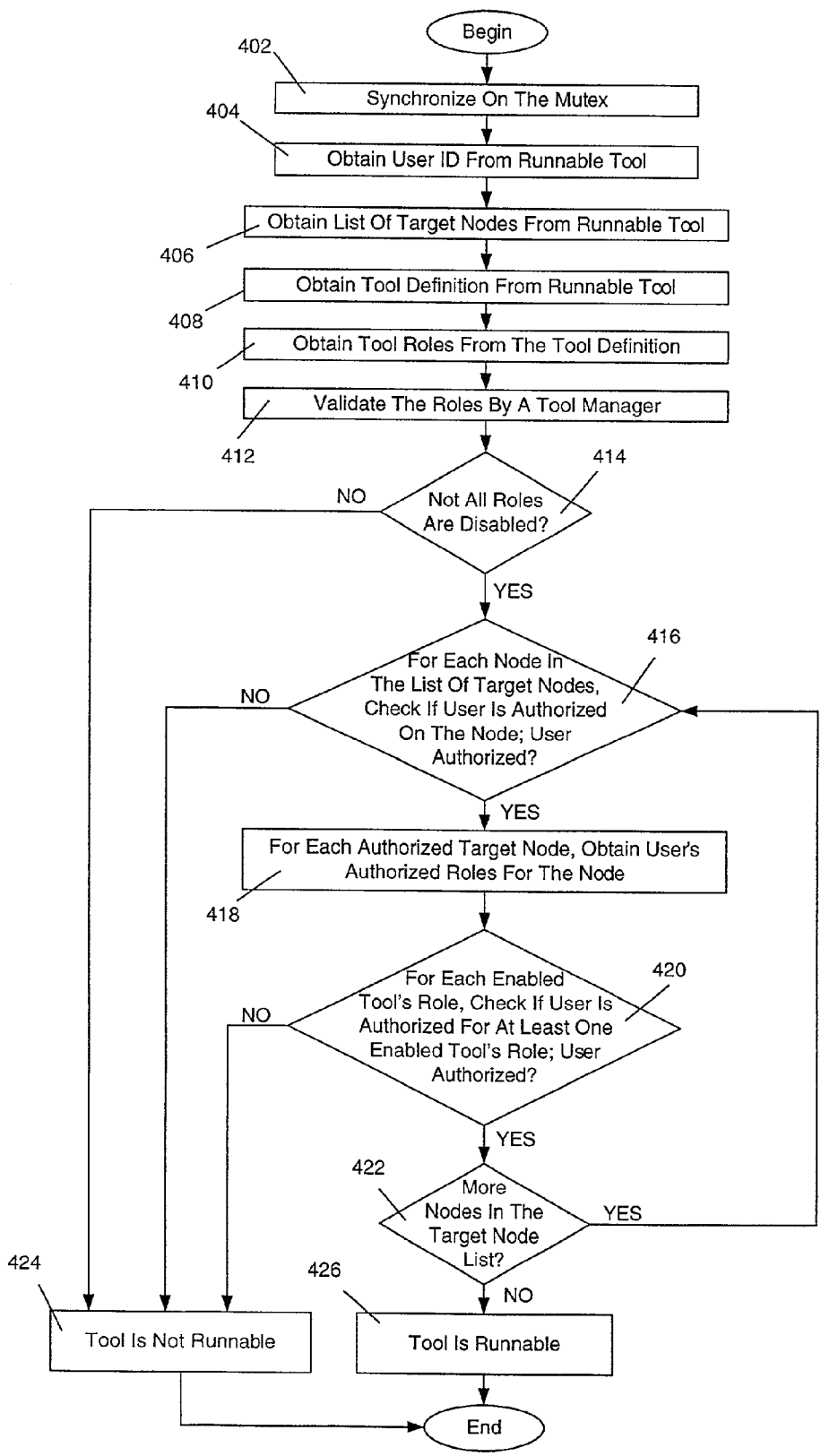
FIG. 4 is a flow chart of a method for checking a user's authorization to run a tool in the SCM module by a security manager.

FIG. 4 is a flow chart of a method for checking a user's authorization to run a tool 240 in the SCM module 110 by a security manager 332. This method may be implemented, for example, in software modules for execution by processor 108. The first step may be synchronizing on the mutual exclusion (MUTEX), step 402. Next, the security manger 332 may obtain user identification (ID), a list of the target nodes 130, and the tool definition from the runnable tool object created by the SCM module 110 based on the task information and the tool definition, steps 404, 406, 408. The tool definition may indicate the roles 220 assigned, typically by the trusted user, to run the tool 240, step 410. The roles 220 may need to be validated by the tool manager 336, step 412. Next, the security manager 332 may execute a loop to check the user's authorization to run the tool 240 on the target nodes 130. If all roles 220 are disabled, step 414, the tool 240 maybe determined as not runnable at all, step 424. Conversely, if not all roles 220 are disabled, for every node 130 in the list of target nodes, the security manager 332 may check if the user 210 is assigned an authorized role 220 on the node 130, step 416. If the user is authorized, for each authorized target node 130, the security manager 332 may obtain the user's authorized roles 220 for the node 130, step 418.

Next, for each tool's enabled role 220, the security manager 332 may check if the user 210 is authorized for at least one of the tool's enabled roles 220 on that node 130, step 420. If the intersection of the vector of the tool's enabled roles 220 and the vector of the user's authorized roles 220 for the node 130 is not the empty set, then there may exist an authorization that allows the user 210 to execute the tool 240 on that node 130. Only if the user 210 is assigned with one of the tool's enabled roles 220 on all of the target nodes 130, the tool 240 is runnable by the user 210, step 426. If the user 210 is not authorized on each of the nodes 130 in the target node list, or if the user 210 is not authorized for any of the tool's enabled roles 220, the tool 240 is not runnable by the user 210, step 424.

While the present invention has been described in connection with an exemplary embodiment, it will be understood that many modifications will be readily apparent to those skilled in the art, and this application is intended to cover any variations thereof.

What is claimed is:

1. A computer implemented method for validating a user's authorization to run a tool in a service control manager (SCM) module by a security manager, comprising:
    creating a runnable tool, wherein the runnable tool encapsulates a tool and includes a tool definition and a list of target nodes on which the tool executes, wherein the tool definition specifies roles associated with the tool via an authorization model, and wherein a user assigned with one or more of the roles can run the tool on the target nodes;
    extracting from the tool definition the roles associated with the tool;
    checking if any of the roles associated with the tool are enabled;

checking if the user has authorization on the target nodes; and checking if the user is assigned with at least one of the enabled roles on all of the target nodes, wherein the user is authorized to run a requested tool if the user is assigned with one or more of the enabled roles associated with the requested tool on all of the target nodes.

2. The computer implemented method of claim 1, wherein the obtaining the roles step includes obtaining the roles associated with the tool, wherein the tool may be assigned one or more roles.

3. The computer implemented method of claim 1, further comprising validating the roles.

4. The computer implemented method of claim 1, further comprising obtaining the user's authorized roles for each node in the list of target nodes from a hash table.

5. The computer implemented method of claim 1, further comprising reporting whether the tool is runnable by the user.

6. The computer implemented method of claim 5, wherein the reporting step includes reporting the tool as not runnable by the user when all the roles are disabled.

7. The computer implemented method of claim 5, wherein the reporting step includes reporting the tool as not runnable by the user when the user is not authorized on each of the nodes.

8. The computer implemented method of claim 5, wherein the reporting step includes reporting the tool as not runnable by the user when the user is not authorized for any of the enabled roles on all of the nodes.

9. A service control manager (SCM) module implemented by a computer for validating a user's authorization to run a tool on one or more target nodes, comprising:
  target nodes that are managed servers;
  tools that specify commands or options on the target nodes, each tool including a tool definition, wherein the tool definition specifies roles associated with a tool via an authorization model;
  roles associated with a tool, wherein a user assigned with one or more of the roles can fun the tool on the target nodes; and
  a security manager that checks whether any of the roles associated with the tool is enabled, and whether the user is assigned with one of the enabled roles on all of the target nodes, wherein the user is authorized to run a requested tool if the user is assigned with one or more of the enabled roles associated with the requested tool on all of the target nodes.

10. The SCM module of claim 9, wherein the tools are single-system aware (SSA) tools.

11. The SCM module of claim 9, wherein the tools are multi-system aware (MSA) tools.

12. The SCM module of claim 9, wherein the target nodes can be target node groups.

13. A computer implemented method for validating a user's authorization to run a tool in a service control manager (SCM) module by a security manager, comprising:
  creating a runnable tool, wherein the runnable tool encapsulates a tool and includes a tool definition and a list of target nodes on which the tool executes, wherein the tool definition specifies roles associated with a the tool via an authorization model, and wherein a user assigned with one or more of the roles can run the tool on the target nodes;
  extracting from the tool definition the roles associated with a the tool;
  checking if any of the roles associated with the tool are enabled; and
  checking if the user is assigned with one of the roles associated with the tool on all of the target nodes, wherein the user is authorized to run a requested tool if the user is assigned with one of the roles associated with the requested tool on all of the target nodes.

14. The computer implemented method of claim 13, wherein the obtaining the roles step includes obtaining the roles associated with the tool, wherein the tool may be assigned one or more roles.

15. The computer implemented method of claim 13, further comprising validating the roles.

16. The computer implemented method of claim 13, further comprising obtaining the user's authorized roles for each node in the list of target nodes from a hash table.

17. The computer implemented method of claim 13, further comprising reporting whether the tool is runnable by the user.

18. The computer implemented method of claim 17, wherein the reporting step includes reporting the tool as not runnable by the user when all the roles are disabled.

19. The computer implemented method of claim 17, wherein the reporting step includes reporting the tool as not runnable by the user when the user is not authorized on each of the nodes.

20. The computer implemented method of claim 17, wherein the reporting step includes reporting the tool as not runnable by the user when the user is not authorized for any of the enabled roles on all of the nodes.

* * * * *

UNITED STATES PATENT AND TRADEMARK OFFICE
CERTIFICATE OF CORRECTION

PATENT NO. : 7,039,948 B2  Page 1 of 1
APPLICATION NO. : 09/800188
DATED : May 2, 2006
INVENTOR(S) : Richard Dale Harrah et al.

It is certified that error appears in the above-identified patent and that said Letters Patent is hereby corrected as shown below:

IN THE SPECIFICATION

Column 4, line 47, delete "anode," and insert therefor --a node,--

IN THE CLAIMS

Claim 13, Column 10, line 11, after "with" delete "a"

Claim 13, Column 10, line 16, after "with" delete "a"

Signed and Sealed this

Sixteenth Day of October, 2007

JON W. DUDAS
*Director of the United States Patent and Trademark Office*